United States Patent
Kim

(10) Patent No.: US 9,296,425 B2
(45) Date of Patent: Mar. 29, 2016

(54) DISCONTINUOUS MULTI-OVERLAPPED VEHICLE BODY MEMBER

(71) Applicant: Hyundai Motor Company, Seoul (KR)

(72) Inventor: Hyun Sik Kim, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/446,033

(22) Filed: Jul. 29, 2014

(65) Prior Publication Data

US 2015/0166106 A1    Jun. 18, 2015

(30) Foreign Application Priority Data

Dec. 16, 2013   (KR) .......................... 10-2013-0156687

(51) Int. Cl.
    *B62D 21/15*    (2006.01)
(52) U.S. Cl.
    CPC ...................................... *B62D 21/15* (2013.01)
(58) Field of Classification Search
    CPC .............. B01D 45/08; B01D 46/0045; B01D 46/0087; B01J 19/126; B01J 19/18; B01J 21/063; B01J 36/1009; B01J 35/1014; B05C 11/1002; B05C 3/02; B21D 53/88; B23H 1/04; B25J 9/163; B41C 1/025; B41F 1/16; B41M 3/006; B60D 1/56
    USPC ............. 296/187.03, 187.09, 187.12, 187.08, 296/197.11, 193.02, 205, 146.6; 293/132, 293/146; 180/65.22, 65.275; 280/500
    See application file for complete search history.

(56) References Cited

U.S. PATENT DOCUMENTS

| | | | | |
|---|---|---|---|---|
| 4,152,012 | A * | 5/1979 | Reidelbach et al. | 280/784 |
| 5,914,163 | A * | 6/1999 | Browne | 428/36.1 |
| 7,097,235 | B2 * | 8/2006 | Yasukouchi et al. | 296/187.03 |
| 7,407,192 | B2 * | 8/2008 | Yoshimura | 280/784 |
| 2004/0201256 | A1 * | 10/2004 | Caliskan et al. | 296/187.08 |
| 2007/0236025 | A1 * | 10/2007 | Glasgow et al. | 293/133 |
| 2012/0200115 | A1 * | 8/2012 | Bettinger | 296/187.03 |

* cited by examiner

*Primary Examiner* — Glenn Dayoan
*Assistant Examiner* — Sunsurraye Westbrook
(74) *Attorney, Agent, or Firm* — Morgan, Lewis & Bockius LLP

(57) ABSTRACT

A discontinuous multi-overlapped vehicle body member may include a plurality of divided members. Each of the divided members may include a front connecting part with a predetermined width and a predetermined length and positioned at a front side in a longitudinal direction, a rear inserting part with a predetermined width smaller than that of the front connecting part and a predetermined length, and positioned at a rear side in the longitudinal direction, an impact absorbing part formed between the front connecting part and the rear inserting part and has a width varied in the longitudinal direction. The rear inserting part of one divided member in the plurality of divided members may be inserted into the front connecting part of an adjacent divided member in the plurality of divided members, and the rear inserting part of the one divided member and the front connecting part of the adjacent divided member may be connected by welding.

11 Claims, 6 Drawing Sheets

DISCONTINUOUS MULTI-OVERLAPPED VEHICLE BODY MEMBER

CROSS-REFERENCE TO RELATED APPLICATION

The present application claims priority of Korean Patent Application Number 10-2013-0156687 filed on Dec. 16, 2013, the entire contents of which application are incorporated herein for all purposes by this reference.

BACKGROUND OF INVENTION

1. Field of Invention

The present invention relates to a discontinuous multi-overlapped vehicle body member, and more particularly, to a discontinuous multi-overlapped vehicle body member having a discontinuous shape in which two or more members are inserted into each other in a longitudinal direction and multiply overlapped with each other.

2. Description of Related Art

In general, a vehicle body member is a structure constituting a vehicle body frame such as a side member, and supports a vehicle body to maintain stiffness. Further, the vehicle body member receives impact energy when collision of a vehicle occurs, and is deformed to absorb the impact energy.

FIGS. 1A and 1B illustrate a side member which is an example of a vehicle member according to the related art. Two plates 101 and 102 are manufactured using a steel plate by a press, and the two plates 101 and 102 are connected to each other through welding by connection flanges to manufacture a side member 100 in the form of a member.

The two plates 101 and 102 are respectively formed by the press so as to have a cross section of an "L" shape and a cross section of a reverse "L" shape. Connection flanges 101a and 102a are formed to integrally extend along edges of the cross sections. Thereafter, the connection flanges 101a and 102a are connected to each other such that the cross section of an "L" shape and the cross section of a reverse "L" shape are combined to be a cross section of a " ⊓ " shape. Subsequently, the side member 100 is manufactured by forming welding portions 103 by welding a plurality of portions through, for example, spot welding.

The manufactured side members 100 are typically disposed at both sides of the vehicle body in a width direction when the side members constitute the vehicle body, and are also disposed to extend in a longitudinal direction of the vehicle body.

When impact is exerted to the vehicle body disposed in such a manner as represented by arrow of FIG. 2, that is, when the vehicle collides with another vehicle or object in a direction deflected from a longitudinal direction of the side member 100 (hereinafter, referred to as a deflection collision) other than a head-on collision where the vehicle accurately collides with the another vehicle or object in the longitudinal direction thereof, the impact exerted to the side member 100 is not accurately exerted in the longitudinal direction of the side member 100, and external impact is exerted in a direction deflected from the longitudinal direction.

For this reason, since the deflected external impact is exerted, the side member 100 is not accurately contracted and deformed in the longitudinal direction, and the deflected external impact acts on the side member 100 as a moment. Thus, buckling where the side member 100 is bent may occur at fragile portions of the side member 100.

When the buckling of the side member 100 is caused, an impact absorbing function of the side member 100 is degraded. Further, when the side member 100 does not properly absorb the impact, since impact is excessively transferred to other portions of the vehicle, the vehicle body may be excessively damaged, and safety of an occupant may be endangered.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a discontinuous multi-overlapped vehicle body member having advantages of effectively absorbing and reducing external impact by being contracted and deformed in a longitudinal direction thereof even though deflected external impact is exerted to a vehicle body member due to a deflection collision of a vehicle.

Various aspects of the present invention provide a discontinuous multi-overlapped vehicle body member including a plurality of divided members. Each of the divided members may include a front connecting part that has a predetermined width and a predetermined length, and is positioned at a front side in a longitudinal direction, a rear inserting part that has a predetermined width smaller than that of the front connecting part and a predetermined length, and is positioned at a rear side in the longitudinal direction, an impact absorbing part formed between the front connecting part and the rear inserting part and has a width varied in the longitudinal direction, wherein the rear inserting part of one divided member in the plurality of divided members is inserted into the front connecting part of an adjacent divided member in the plurality of divided members, and the rear inserting part of the one divided member and the front connecting part of the adjacent divided member are connected by welding.

One or each of the divided members may have a cross section of a substantially " ⊓ " shape that is continuous in the longitudinal direction. One or each of the divided members may have a hollow square box shape. A plurality of welding portions may be formed in a circumferential direction of the front connecting part of the adjacent divided member. The front connecting part of one or each of the divided members may have the width larger than the width of the rear inserting part by a thickness.

The width of the impact absorbing part may be varied by the thickness from a front end continuous to the front connecting part to a rear end continuous to the rear inserting part. The width of the impact absorbing part may be linearly varied from the front end continuous to the front connecting part to the rear end continuous to the rear inserting part.

A length of the front connecting part of one or each of the divided members may be substantially the same as a length of the rear inserting part, and a length of the impact absorbing part may be larger than the lengths of the front connecting part and the rear inserting part.

The rear inserting part of the one divided member may be inserted into the front connecting part of the adjacent divided member with a gap such that the rear inserting part is not completely inserted into the front connecting part.

The plurality of divided members, with adjacent divided members inserted into each other in the longitudinal direction and connected through welding, may constitute a side member of a vehicle body. One or each of the divided members may be manufactured by a hydroforming method.

According to the present invention, a plurality of divided members includes a front connecting part that has a predetermined width and a predetermined length, a rear inserting part that has a predetermined width smaller than that of the front connecting part and a predetermined length, and an impact absorbing part that is formed between the front connecting part and the rear inserting part and in which a width is varied in a longitudinal direction, and the rear inserting part of a plurality of divided members is inserted into the front connecting part and is connected to be overlapped with each other through welding. When impact is exerted to the divided members, the welding portions of the divided members are firstly damaged to primarily absorb and reduce the impact. Further, the impact absorbing part of the divided member is inserted into the front connecting part of the adjacent divided member to cause frictional deformation (extensional and contractional deformations), so that it is possible to effectively reduce external impact.

Accordingly, even though impact exerted from the outside is not accurately exerted in a direction deflected from the longitudinal direction of the vehicle body member, the welding portions of the members are damaged to primarily absorb and reduce the external impact and moment, and buckling of the vehicle body member can be prevented. Further, the member is inserted into the adjacent member due to the continued external impact to cause friction, and extensional and contractional deformations, so that the external impact is secondarily absorbed and reduced. Accordingly, it is possible to improve impact absorbing performance of the vehicle body to which the vehicle body member according to various embodiments of the present invention is applied. As a result, an excess damage of the vehicle body can be prevented, and it is possible to more safely protect an occupant of the vehicle body from the external impact.

Further, since the divided members are manufactured by a hydroforming method, it is easy to manufacture the divided members. In addition, it is possible to reduce weight and manufacturing cost in compassion to the vehicle body member of the related art, and it is possible to improve connectivity to other components of the vehicle body.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
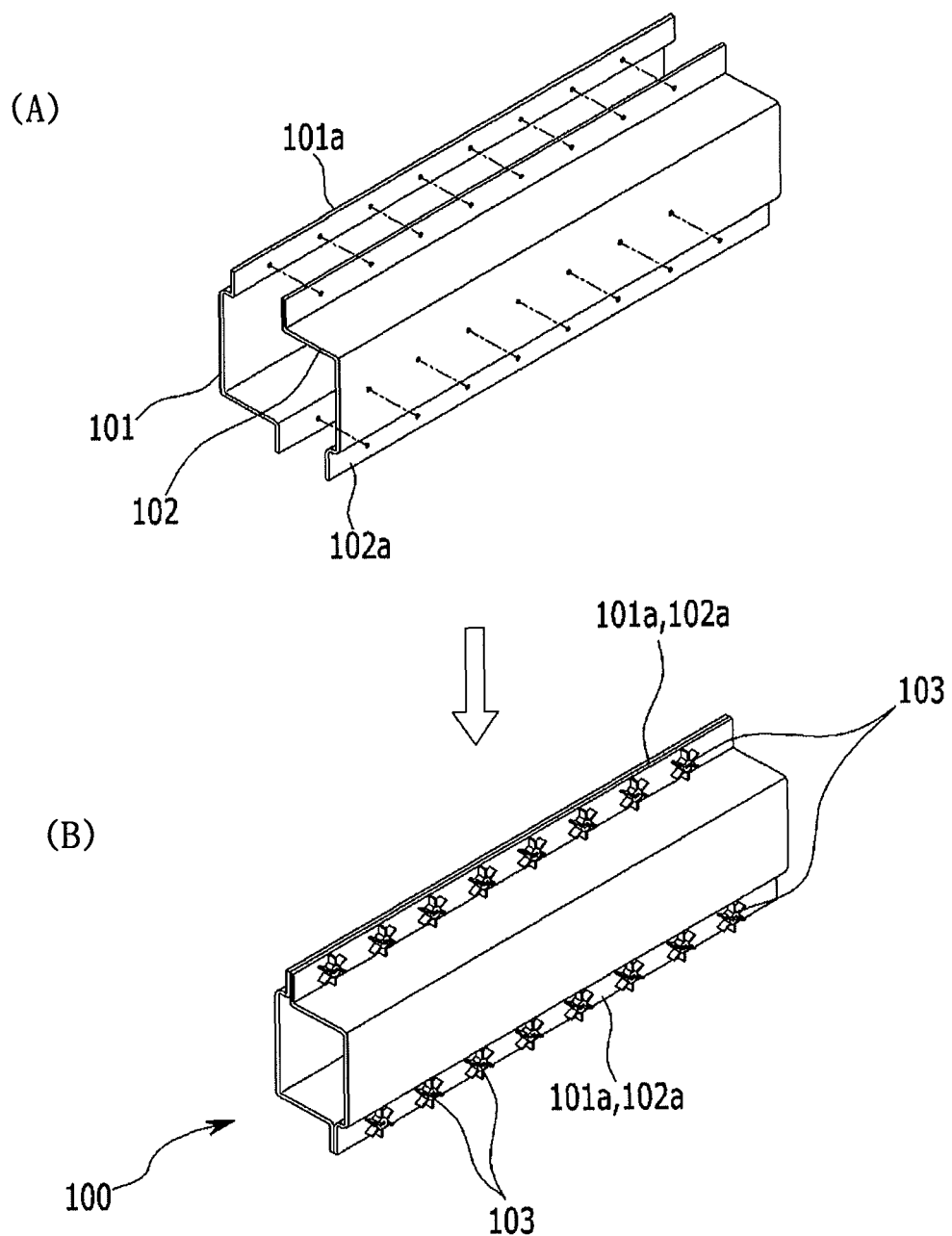
FIGS. 1A and 1B illustrate exploded and connected perspective views of a side member according to the related art.
Figure 2:
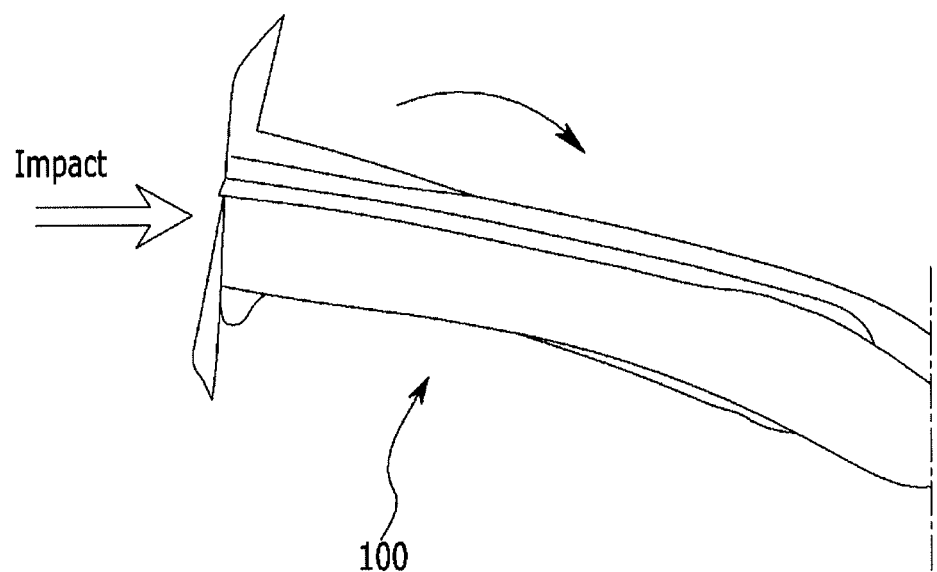
FIG. 2 is an explanatory diagram for describing buckling caused when external impact is exerted to the side member according to the related art.
Figure 3:
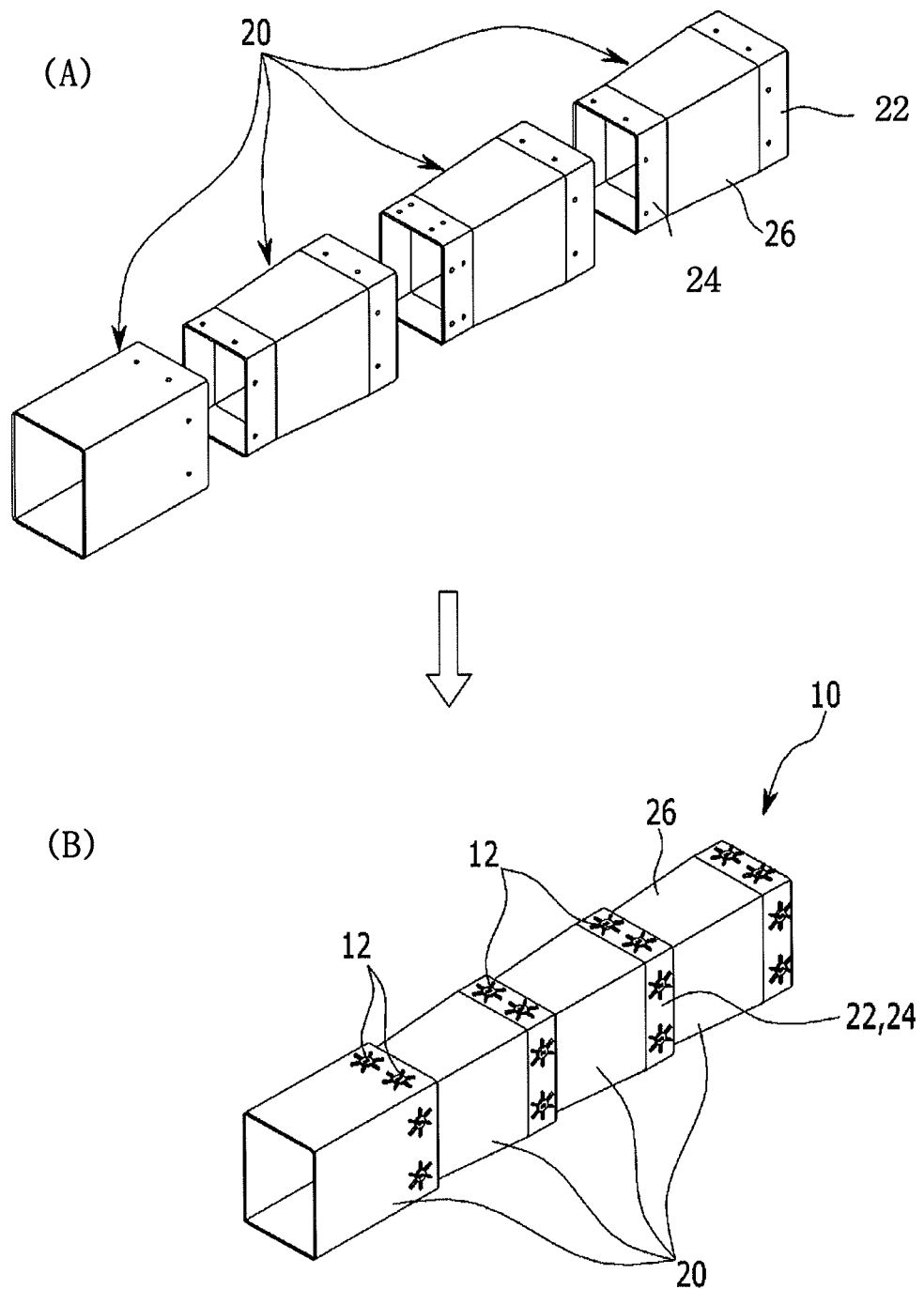
FIGS. 3A and 3B illustrate exploded and connected perspective views of an exemplary vehicle body member according to the present invention.
Figure 4:
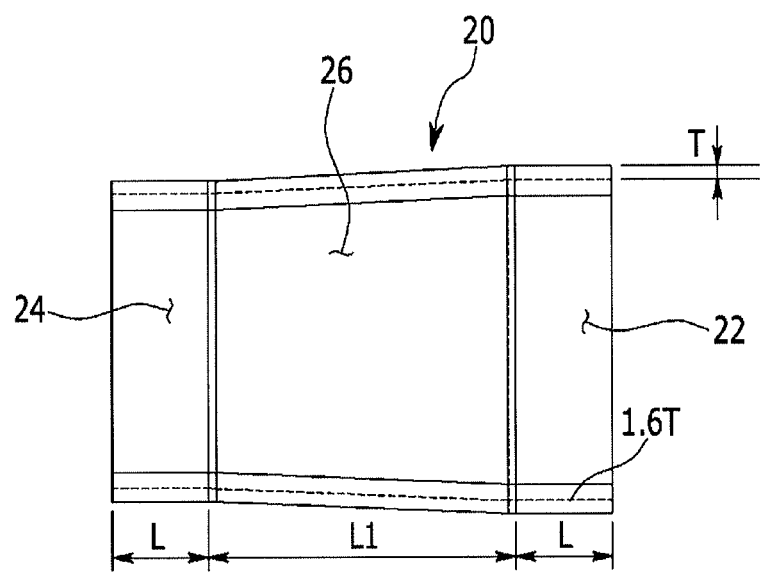
FIG. 4 is a front view of an exemplary divided member according to the present invention.

Referring to FIGS. 3A and 3B, a vehicle body member 10 according to various embodiments of the present invention may have a structure in which a plurality of divided members 20 are connected in a longitudinal direction in an insertion and connection manner.

The divided members 20 may have a structure in which cross sections of a substantially "⊏" shape are continuous in the longitudinal direction thereof. The divided members 20 may have a hollow square box shape. The divided member 20 may have a triangular cross section or a polygonal cross section or other suitable cross sections.

Parts of the divided members 20 may be inserted to be overlapped with each other, and the divided members may be connected to each other such as by welding, for example, spot-welding the overlapped parts. A plurality of welding portions 12 formed through the spot welding may be formed along the overlapped parts. That is, the plurality of welding portions 12 may be formed in a circumferential direction of the divided member 20 with a predetermined distance.

Each of the divided members 20 includes a front connecting part 22 that has a predetermined length and a predetermined width and is positioned at a front side in the longitudinal direction, a rear inserting part 24 that has a predetermined width relatively smaller than that of the front connecting part 22 and a predetermined length and is positioned at a rear side in the longitudinal direction, and an impact absorbing part 26 that integrally connects the front connecting part 22 and the rear inserting part 24 and in which a width is varied in the longitudinal direction.

The front connecting part 22 may have a width larger than a width of the rear inserting part 24 by a thickness T of the divided member 20. Accordingly, a variable width of the impact absorbing part 26 from a front end continuous to the front connecting part 22 to a rear end continuous to the rear connecting part 24 is about the thickness T. The variable width of the impact absorbing part 26 may be linearly variable from the front end to the rear end.

A length L of the front connecting part 22 may be the same as a length L of the rear inserting part 24. A length L1 of the impact absorbing part 26 may be larger than the lengths L of the front connecting part 22 and the rear inserting part 24.

Referring to FIGS. 3A and 3B, the rear inserting part 24 of the divided member 20 is inserted into and connected to the front connecting part 22 of the adjacent divided member 20, and the rear inserting part 24 is inserted into the front connecting part 22 to be overlapped with each other. Thereafter, the adjacent divided members 20 may be connected to each other through welding by spot-welding the overlapped parts.

Figure 5:
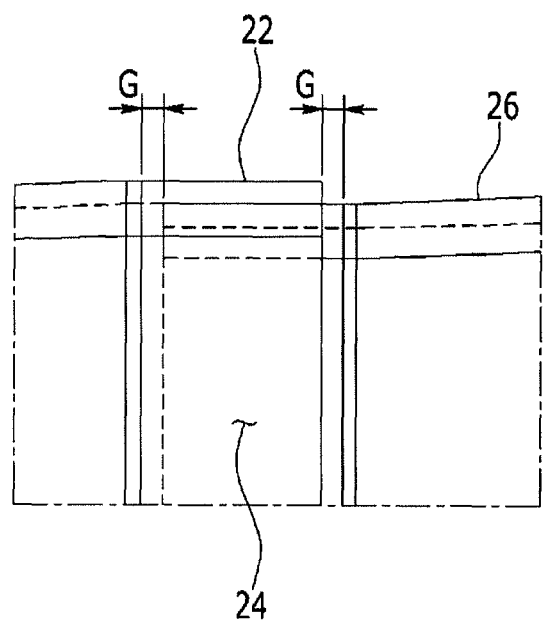
FIG. 5 is an enlarged detail view of a connected portion where exemplary divided members adjacent to each other are connected.

Referring to FIG. 5, when the adjacent divided members 20 are connected by inserting the rear inserting part 24 into the front connecting part 22, the length L of the front connecting part 22 is the same as the length L of the rear inserting part 24. However, the rear inserting part 24 is inserted into the front connecting part 22 with a slight gap G without being completely inserted into the front connecting part.

The gap (G) provides a clearance for completely inserting the rear inserting part 24 into the front connecting part 22 when impact is exerted to the vehicle body member 10 to firstly damage the welding portions 12.

Figure 6:
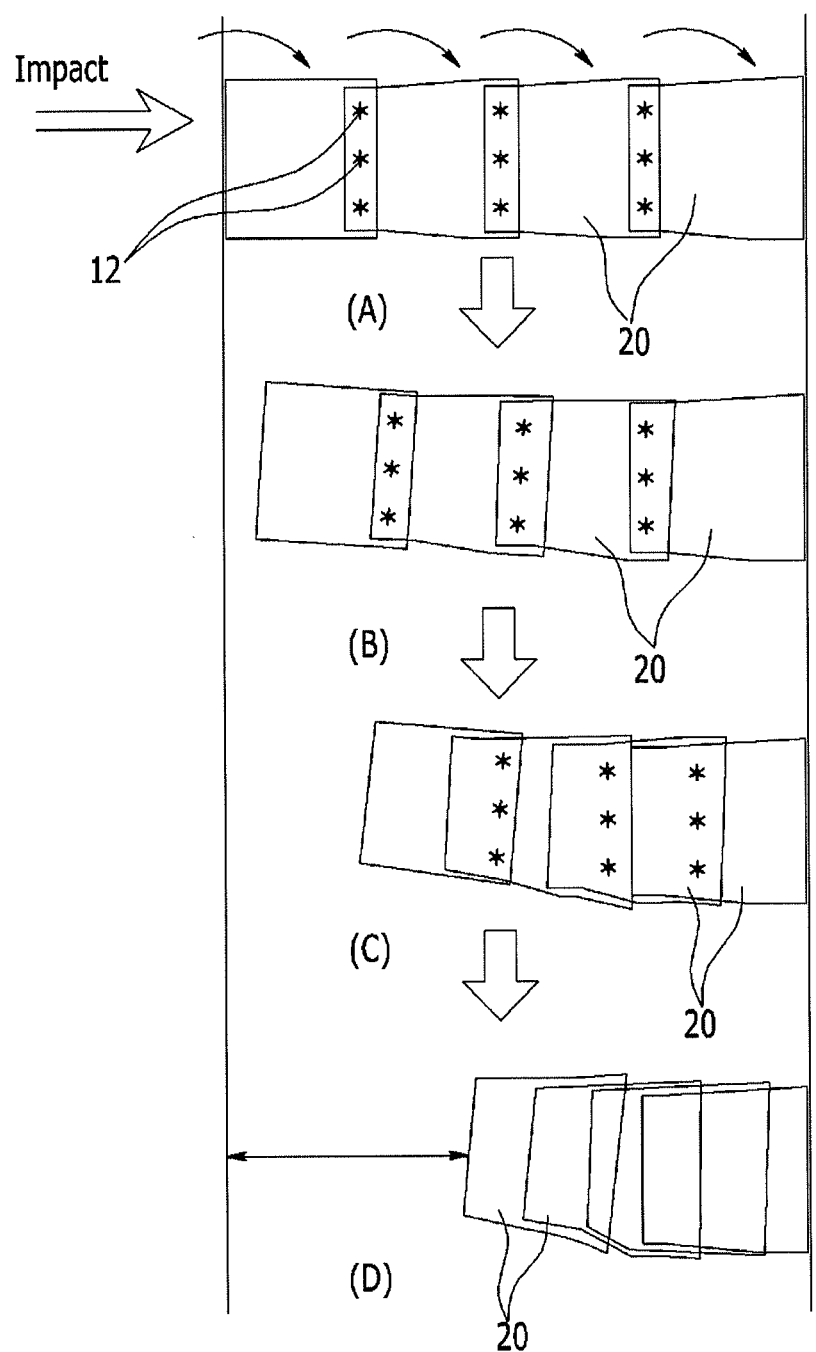
FIGS. 6A-6D are a diagram illustrating deformation of an exemplary vehicle body member according to the present invention when receiving external impact.

Referring to FIG. 6A, when there occurs a head-on collision of the vehicle equipped with the vehicle body member 10 having the aforementioned or similar configuration according to various embodiments of the present invention, external impact may be exerted to the vehicle body member 10 in a direction deflected from the longitudinal direction as represented by arrow. The deflected external impact may act on the vehicle body member 10 as a compressive force and a buckling moment as represented by arrow.

When the compressive force and the buckling moment are applied to the vehicle body member 10, since the welding portions 12 of the vehicle body member 10 are the most vulnerable portions, the welding portions 12 connecting the divided members 20 receive both the buckling moment and the compressive force to be damaged. The welding portions 12 are damaged, and a part of the rear inserting part 24 is inserted into the front connecting part 22 by the gap G at the same time. Some of the compressive force and the moment is primarily absorbed and reduced due to the damage of the welding portions 12 and the contraction of the vehicle body member 10 by the gap G. Further, since the moment is concentrated on any portion of the vehicle body member 10, the buckling of the vehicle body member 10 is not caused (FIG. 6B).

When the external impact and the moment are continuously applied to the vehicle body member 10, the impact absorbing part 26 is inserted into the front connecting part 22 of the adjacent divided member 20 to cause friction between an inner surface of the front connecting part 22 and an outer surface of the impact absorbing part 26. Further, due to a difference between a width of the outer surface of the impact absorbing part 26 and a width of the inner surface of the front connecting part 22, the front connecting part 22 is separated outward in a width direction to cause extensional deformation and the width of the outer surface of the impact absorbing part 26 is decreased by the inner surface of the front connecting part 22 to cause contractional deformation. The moment and the compressive force applied to the vehicle body member 10 are secondarily absorbed and reduced by the friction, the extensional deformation, and the contractional deformation (FIG. 6C).

When the external impact and the moment are continuously even more applied to the vehicle body member 10, the front connecting part 22 or the impact absorbing part 26 may be torn and deformed, and the adjacent divided members are completely overlapped. Thus, the external compressive force and the moment are tertiary absorbed and reduced (FIG. 6D).

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A discontinuous multi-overlapped vehicle body member, comprising:
    a plurality of divided members, each including:
        a front connecting part having a predetermined width and a predetermined length, and positioned at a front side in a longitudinal direction of the discontinuous multi-overlapped vehicle body member;
        a rear inserting part having a predetermined width smaller than that of the front connecting part and a predetermined length, and positioned at a rear side in the longitudinal direction; and
        an impact absorbing part formed between the front connecting part and the rear inserting part and having a width varied in the longitudinal direction,
    wherein the rear inserting part of one divided member in the plurality of divided members is inserted into the front connecting part of an adjacent divided member in the plurality of divided members, and
    wherein the rear inserting part of the one divided member and the front connecting part of the adjacent divided member are connected by welding.

2. The discontinuous multi-overlapped vehicle body member of claim 1, wherein one or each of the divided members has a cross section of a substantially "⊐" shape that is continuous in the longitudinal direction.

3. The discontinuous multi-overlapped vehicle body member of claim 1, wherein one or each of the divided members has a hollow square box shape.

4. The discontinuous multi-overlapped vehicle body member of claim 1, wherein a plurality of welding portions is formed in a circumferential direction of the front connecting part of the adjacent divided member.

5. The discontinuous multi-overlapped vehicle body member of claim 1, wherein the front connecting part of one or each of the divided members has the width larger than the width of the rear inserting part by a thickness.

6. The discontinuous multi-overlapped vehicle body member of claim 5, wherein the width of the impact absorbing part is varied by the thickness from a front end continuous to the front connecting part to a rear end continuous to the rear inserting part.

7. The discontinuous multi-overlapped vehicle body member of claim 6, wherein the width of the impact absorbing part is linearly varied from the front end continuous to the front connecting part to the rear end continuous to the rear inserting part.

8. The discontinuous multi-overlapped vehicle body member of claim 1, wherein:
    the length of the front connecting part of one or each of the divided members is substantially the same as the length of the rear inserting part; and
    a length of the impact absorbing part is larger than the lengths of the front connecting part and the rear inserting part.

9. The discontinuous multi-overlapped vehicle body member of claim 4, wherein the rear inserting part of the one divided member is inserted into the front connecting part of the adjacent divided member with a gap such that the rear inserting part is not completely inserted into the front connecting part.

10. The discontinuous multi-overlapped vehicle body member of claim 1, wherein the plurality of divided members, with adjacent divided members inserted into each other in the longitudinal direction and connected through welding, constitute a side member of a vehicle body.

11. The discontinuous multi-overlapped vehicle body member of claim 1, wherein one or each of the divided members is manufactured by a hydroforming method.

* * * * *